UNITED STATES PATENT OFFICE.

CARL STEPHAN AND ARNOLD RAHTJEN, OF HAMBURG, GERMANY.

PROCESS OF MAKING SULFUROUS-ACID COMPOUND OF ALPHA-ISATIN ANILID.

937,194. Specification of Letters Patent. Patented Oct. 19, 1909.

No Drawing. Application filed July 13, 1908. Serial No. 443,361.

*To all whom it may concern:*

Be it known that we, CARL STEPHAN and ARNOLD RAHTJEN, subjects of the Emperor of Germany, residing at Hamburg, in the Empire of Germany, have invented certain new and useful Improvements in Processes of Making Sulfurous-Acid Compounds of Alpha-Isatin Anilid and Its Homologues, of which the following is a specification.

This invention relates to a process of producing compounds of alpha-isatin anilid and its homologues with sulfurous acid.

We have discovered by experiment that compounds of alpha-isatin anilid and its homologues containing the sulfurous acid radical can be produced from an acid solution of alpha-isatin anilid, so that it is unnecessary to neutralize the sulfuric or other acid used for holding the alpha-isatin anilid in solution or suspension. This discovery is of particular interest and importance as organic compounds containing the sulfurous acid radical cannot ordinarily be formed in the presence of any other acid stronger than sulfurous acid, and in fact such organic compounds are ordinarily decomposed by any other acid stronger than sulfurous acid.

We have found when one part of diphenyl-oxalamidinthioamid is treated with four parts of hot sulfuric acid preferably of 66° Bé'. there is obtained a solution of alpha-isatin anilid in sulfuric acid. The separation of the alpha-isatin anilid from this acid solution in the usual way necessarily requires enormous quantities of an alkali, as for example, soda, and ice, as all of the sulfuric acid employed must be neutralized and the liquid well cooled in order to obtain the precipitate of alpha-isatin anilid. Furthermore in this process the alpha-isatin anilid formed has a strong tendency to decompose so that the process is not only costly but impracticable.

In the practice of our process we pour an acid, holding alpha-isatin anilid or a salt thereof, in solution or suspension, into sulfurous acid or into a solution of reagents containing or capable of giving off sulfurous acid. The acid containing the alpha-isatin anilid in solution or suspension must be diluted so as not to interfere with the reaction above described. The degree of dilution of the acid may vary widely, satisfactory results being obtained where one part of acid is diluted with five parts of water. In fact a mere trace of the free acid in water is ordinarily sufficient. Only sufficient sulfurous acid or compounds containing or capable of giving off sulfurous acid are required to be molecularly equivalent to the alpha-isatin anilid present.

We are able to obtain satisfactory results if either the sulfurous acid or compounds containing or adapted to give off this acid or the acid containing the alpha-isatin anilid in solution or suspension is diluted. In either case the sulfurous acid compound of the alpha-isatin anilid is produced and separates in the form of a reddish granular precipitate. The alpha-isatin anilid may be separated from the sulfurous acid compound of alpha-isatin anilid by adding alkali, as sodium hydroxid, in molecular proportions, no ice being required to control the reaction.

The following examples illustrate various ways in which our process can be satisfactorily practiced.

Example No. 1: To 25 kilograms of diphenyloxalamidinthioamid or a homologue therefor add 100 kilograms of hot sulfuric acid. A solution of 22 kilograms of alpha-isatin anilid or a homologue thereof in the sulfuric acid will be obtained. Pour this solution into 1000 liters of water containing 7 kilograms of sulfurous acid gas dissolved therein. Almost immediately there will be formed a precipitate of a sulfurous acid compound of alpha-isatin anilid or a homologue thereof. The precipitate may be separated from the liquid by decantation or filtration and the remaining liquid will consist of dilute sulfuric acid, the sulfurous acid employed having combined with the alpha-isatin anilid or its homologue.

Example No. 2: Proceed as directed in Example No. 1 but instead of using dilute sulfurous acid substitute therefor 10.5 kilograms of bisulfite of soda or 25.2 kilograms or crystallized sulfite of soda dissolved in 1000 liters of water. The compound of the sulfurous acid radical with the alpha-isatin anilid is thereby precipitated, the sulfurous acid radical contained in the salts employed being combined with the alpha-isatin anilid. Instead of employing the sulfurous acid salts above referred to thiosulfates or other compounds containing the sulfurous acid radical may be employed.

Example No. 3: Instead of employing alpha-isatin anilid as hereinbefore described a corresponding quantity of alpha-isatin anilid hydrochlorid may be mixed with the stated quantity of dilute sulfurous acid and the sulfurous compound of alpha-isatin anilid will be formed, hydrochloric acid being set free.

It is to be understood that instead of using alpha-isatin anilid or a compound of alpha-isatin anilid, homologues or corresponding compounds of homologues may be employed and that the compounds, homologues and compounds of homologues of alpha-isatin anilid are the equivalents of alpha-isatin anilid in the practice of our process as hereinbefore set forth.

Having described our invention, we claim,

1. The process of producing a compound of alpha-isatin anilid which consists in mixing an acid containing alpha-isatin anilid with a reagent containing the sulfurous acid radical.

2. The process of producing a compound of alpha-isatin anilid which consists in mixing an acid solution of alpha-isatin anilid with a reagent containing the sulfurous acid radical.

3. The process of producing a compound of alpha-isatin anilid which consists in mixing an acid solution of alpha-isatin anilid with sulfurous acid.

4. The process of producing a compound of alpha-isatin anilid which consists in mixing an acid holding therein salts containing alpha-isatin anilid with reagents containing the sulfurous acid radical.

5. The process of producing a compound of alpha-isatin anilid which consists in mixing an acid solution of salts containing alpha-isatin anilid with a reagent containing the sulfurous acid radical.

6. The process of producing a compound of alpha-isatin anilid which consists in mixing an acid solution of salts containing alpha-isatin anilid with sulfurous acid.

In testimony whereof we affix our signatures in presence of two witnesses.

CARL STEPHAN.
ARNOLD RAHTJEN.

Witnesses:
ERNEST H. L. MUMMENHOFF,
OTTO W. HILLMRICH.